United States Patent
Fischer et al.

(10) Patent No.: US 6,487,925 B2
(45) Date of Patent: Dec. 3, 2002

(54) ARRANGEMENT FOR A TORQUE-FREE SHIFTING OF A TRANSMISSION

(75) Inventors: Roland Fischer, Nidderau (DE); Reinhard Seyer, Rodgau (DE); Werner Hillenbrand, Neuffen (DE); Klaus Hoffman, Seeheim-Jugenheim (DE); Xiaoyi Liu, Winnenden (DE); Hilmar Schmalz, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/843,099

(22) Filed: Apr. 27, 2001

(65) Prior Publication Data

US 2001/0035061 A1 Nov. 1, 2001

(30) Foreign Application Priority Data

Apr. 27, 2000 (DE) ......................................... 100 20 643

(51) Int. Cl.[7] .............................................. F16H 59/14
(52) U.S. Cl. ....................................................... 74/337
(58) Field of Search ........................... 477/124, 80, 906; 74/336 R, 337

(56) References Cited

U.S. PATENT DOCUMENTS

| | | | | | |
|---|---|---|---|---|---|
| 3,011,340 A | * | 12/1961 | Dahle et al. | .................. | 73/136 |
| 4,100,794 A | * | 7/1978 | Meixner | .................. | 73/136 A |
| 4,259,882 A | * | 4/1981 | Miller | .......................... | 74/337 |
| 4,962,672 A | * | 10/1990 | Yagi et al. | ................ | 73/862.36 |
| 5,697,864 A | * | 12/1997 | Watanabe | .................... | 477/124 |
| 5,741,202 A | * | 4/1998 | Huber | .......................... | 74/337 |
| 5,910,068 A | * | 6/1999 | Krauss et al. | ................ | 477/124 |
| 6,145,399 A | * | 11/2000 | Bockmann et al. | ......... | 477/124 |
| 6,361,473 B1 | * | 3/2002 | Mason et al. | ................ | 477/124 |

FOREIGN PATENT DOCUMENTS

| DE | 3624846 A1 | 1/1988 |
|---|---|---|
| DE | 38 16828 A1 | 11/1989 |

* cited by examiner

*Primary Examiner*—Sherry Estremsky
(74) *Attorney, Agent, or Firm*—Venable; Norman N. Kunitz

(57) ABSTRACT

An arrangement with a torque-controlled gearbox, for which the torque present on the transmission driving shaft is measured with a non-contacting torque sensor and the torque sensor supplies a measuring signal, which is fed to the gear control unit as a variable for the correct shifting moment. With a motor vehicle having an internal combustion engine, the drive output of the combustion engine is transmitted to the crankshaft, and the torque present at the crankshaft is transmitted via a clutch and an intermediate gear to the transmission drive shaft, from there to an output drive shaft, and finally via a differential gear to the drive wheels of the motor vehicle. The torque sensor detects the torque actually present at the transmission drive shaft and feeds the measuring signal proportional to this torque to a gear control unit. The arrangement advantageously permits a torque-free shifting of gears in the gearbox, which can thus be carried out comfortably.

17 Claims, 2 Drawing Sheets

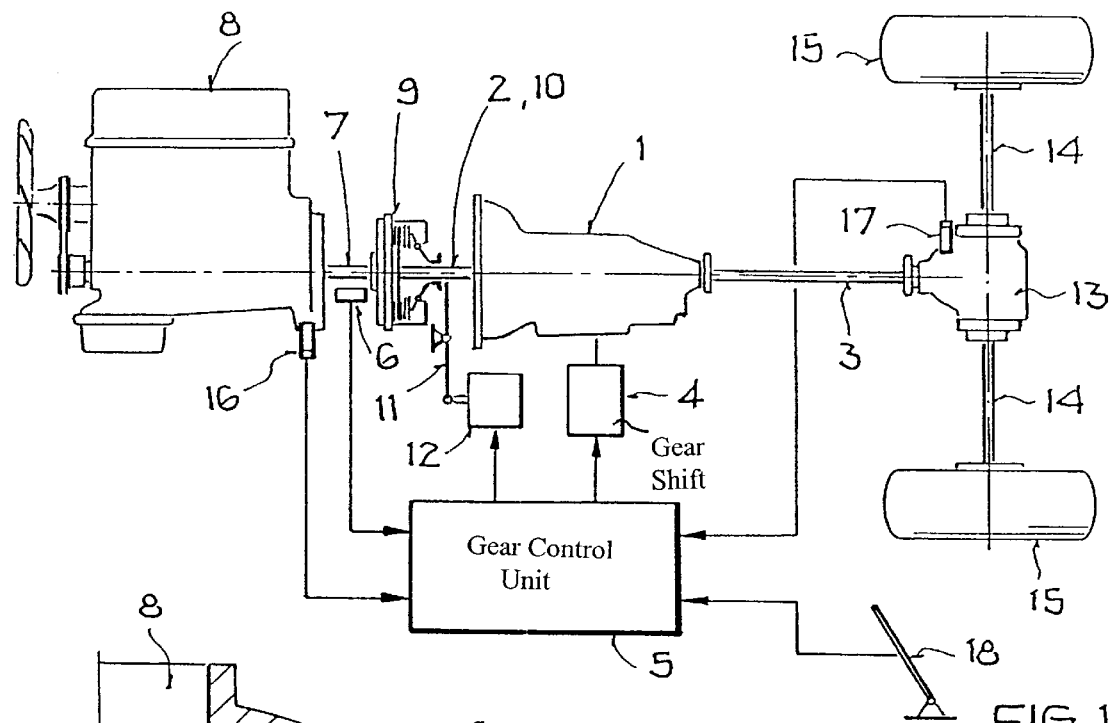
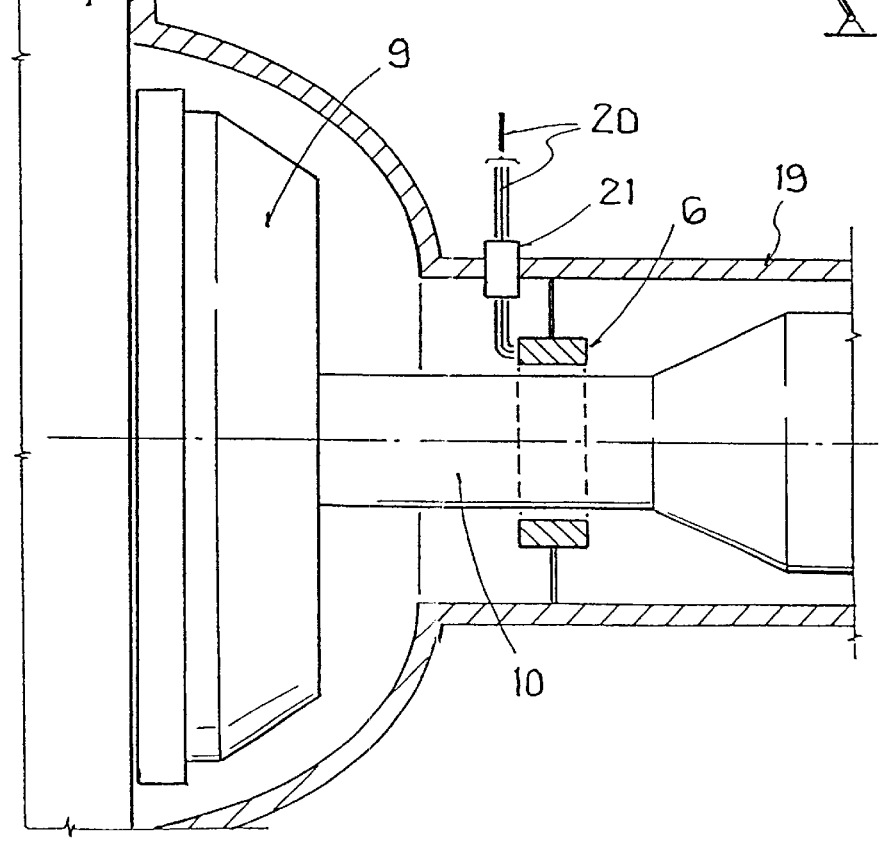

ARRANGEMENT FOR A TORQUE-FREE SHIFTING OF A TRANSMISSION

CROSS REFERENCE TO RELATED APPLICATION

This application claims the priority of German Patent Application No. 100 20 643.3-14 filed Apr. 27, 2000, which is incorporated herein by reference.

BACKGROUND OF THE INVENTION

The invention relates to an arrangement for the torque-free shifting of a mechanical gearbox.

Until now, the number of engine revolutions, the countershaft revolutions and the output shaft revolutions, as well as the computed engine torque were used as control variables for shifting gears in partially or fully automatic gearboxes. In the case of transmissions where the clutch is not opened for shifting the gears, it is extremely important for reasons of comfort that the transmission is torque-free during the shifting from a gear to the neutral position. An unacceptable torque jolt may otherwise occur as a result of releasing the pre-stressing of a gear wheel and the transmission drive shaft. Detecting the zero passage of the torque with the aid of a computed engine torque curve is not precise enough for this. A sensing of the actually present torque is therefore required.

It is the object of the invention to provide a torque-controlled gearbox, for which the actually present torque at the transmission driving shaft is detected as an additional control variable for the shifting operation.

SUMMARY OF THE INVENTION

The above object generally is achieved according to the present invention by an arrangement for the torque-free shifting of gears in a drive assembly with a mechanical gearbox, which arrangement comprises: a mechanical gearbox having a plurality of gears for changing the transmission ratio for the number of revolutions at the input drive shaft of the gearbox and the output drive shaft of the gearbox; a controllable gearshift for actuating the gearbox and selectively engaging the different gears; a gear control unit, which is responsive to input variable control signals, for activating the gearshift; and at least one inductive torque sensor that is installed near the surface of a shaft for the drive assembly. The inductive source sensor includes at least one exciter coil for the induction of a magnetic alternating field in one of the shafts of the drive assembly, and at least two sensor coils. One of the sensor coils detects the magnetic field induced in the shaft in the compression stress direction and the other sensor coil detects the magnetic field induced in the shaft in tensile stress direction, and the two sensor coils are arranged in a difference circuit that provides a difference signal as an output measuring signal for the torque sensor, with the difference signal being fed to the gear control unit as an input variable control signal. Additional advantageous features and embodiments are disclosed and described.

The solution is obtained with a torque-controlled gearbox where the torque present at the transmission driving shaft is measured by a non-contacting torque sensor. The torque sensor delivers a measuring signal that is supplied to a gear control unit as a measure for the correct shifting moment. With a motor vehicle having an internal combustion engine, the drive output of the combustion engine is transmitted to the crankshaft. A clutch transmits the torque present at the crankshaft to the transmission driving shaft, then transmits it from there via an intermediate gear to an output shaft and finally via a differential gear to the drive wheels of the motor vehicle. The torque sensor detects the torque actually present at the transmission driving shaft and feeds the measuring signal belonging to this torque to a gear control unit. The gear control unit is furthermore connected to a revolution sensor for detecting the engine revolutions, to a speed sensor for detecting the vehicle speed and to a gas-pedal sensor for detecting the gas-pedal position. The clutch and the gearbox are activated by driven final control elements actuated by the gear control unit. The gears in the transmission are preferably shifted at those moments where no torque is present at the transmission drive shaft. The zero passage of the torque curve at the transmission driving shaft, measured with the torque sensor, in this case is selected as a measure for the correct shifting moment.

The magneto-elastic effect on rotating shafts subjected to torque is used to measure the torque itself. If a shaft is twisted as a result of a torque, then areas of compressive stress and areas of tensile stress form on the surface of the shaft with torque. The directions for tension and pressure are perpendicular to each other. The magnetic properties of ferromagnetic materials such as steel for producing tools change under the influence of mechanical tensile stresses and compression stresses. These changes in the magnetic properties are measured with the aid of a torque sensor, comprising at least one exciter coil and at least two sensor coils. For this, the sensor is attached near the shaft surface and a magnetic alternating field is generated with the exciter coil, for which the magnetic field lines penetrate the shaft. As a result of the magneto-elastic effect, the size and direction of the magnetic field generated with the exciter coil in the shaft subjected to torque will differ, both in compression stress direction and in a tensile stress direction. One of the sensor coils of the torque sensor detects the magnetic field induced in the compression stress direction, while the other torque sensor coil detects the magnetic field induced in the shaft in the tensile stress direction. The two sensor coils or their measuring signals for the compression stress direction and the tensile stress direction are components of a difference circuit. The torque sensor therefore supplies a difference signal for the compression stress direction and the tensile stress direction. A magneto-elastic effect is not present in the shaft if there is no torque, meaning if the shaft is not subjected to compression stresses and tensile stresses. In that case, the magnetic field shares are equal in compression stress direction and in the tensile stress direction, and the difference signal of the torque sensor indicates a zero passage. The zero passage of the difference signal from the sensor coils of the torque sensor thus indicates a torque-free condition of the shaft and functions as a measure for indicating the suitable shifting moment. The difference signal is used as a control variable for the gear control unit.

The following advantages are primarily achieved with the invention:

The torque controlled transmission according to the invention permits a non-jolting shifting of the gears for semi-automatic or fully automatic transmissions. The mechanical components are thus protected, wear and tear is reduced and the service life of transmission and clutch, in particular, is increased.

The torque detection or the detection of the torque-free condition of the transmission driving shaft for the first time offers the option of shifting gears without torque and thus comfortably, without having to open the clutch. As a result, the torque-controlled transmission according to the invention is particularly suitable for all gearboxes with automatic shifting, for which the clutch remains closed during the shifting of the gears.

However, the torque-controlled transmission according to the invention is also advantageous if the clutch is to be opened during the shifting of the gears. Detecting the torque-free condition is important for those gears as well because, on the one hand, the clutch is released without jolting if the torque present before the clutch release is near zero while, on the other hand, it permits a reliable detection of the clutch opening and whether the clutch has completely separated the crankshaft from the transmission driving shaft. In that case, the gearshift according to the invention also makes it possible to detect the correct shifting moment. In particular, it is possible to detect a clutch malfunction if no torque-free condition occurs despite the fact that the clutch on the transmission driving shaft is engaged. The clutch/transmission system can thus be diagnosed and a dragging clutch detected with the aid of the gear control unit. The clutch does not function properly if the torque sensor in the gear control unit does not show a zero passage of the differential signal as indication of the torque-free condition of the transmission driving shaft, even though the control elements for opening the clutch are activated. Excessive wear resulting from clutches that drag or are incorrectly adjusted can thus be detected and avoided.

Exemplary embodiments of the invention are shown in the following and are explained in further detail.

BRIEF DESCRIPTION OF THE DRAWINGS

FIG. 1 is a diagram of an arrangement according to the invention for the torque-free shifting of a transmission, during a typical motor-vehicle use.

FIG. 2 is a diagram of a possible arrangement of the torque sensor between the transmission case and the transmission driving shaft.

DETAILED DESCRIPTION OF THE PREFERRED EMBODIMENTS

Figure 3:
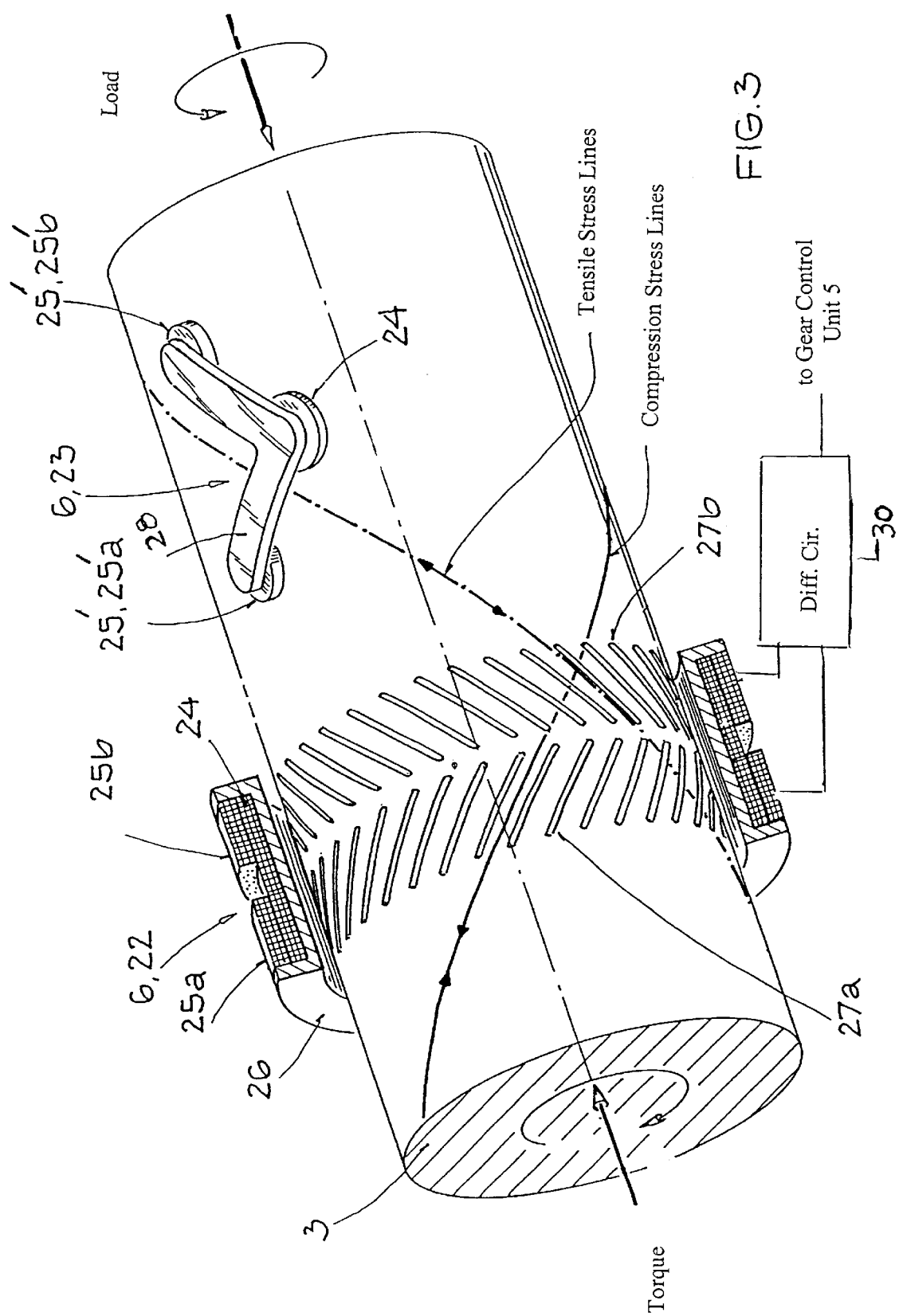
FIG. 3 is a graphic representation, designed to explain the principle for measuring the torque on a shaft by use of the magneto-elastic effect, upon which the invention is based.

FIG. 1 is a diagram of a gearbox 1, that transmits the number of revolutions of an input side drive shaft 2 to an output side output shaft 3. The gearbox is shifted with a controllable gearshift 4, which is also shown schematically. This gearshift 4 is connected to and controlled by a gear control unit 5.

A non-contacting torque sensor 6, installed near the shaft surface of a drive assembly shaft, is connected to the gear control unit 5 and supplies a measuring signal as a control variable to the gear control unit. For the embodiment shown in FIG. 1, the torque sensor is arranged near the shaft surface of crankshaft 7. The crankshaft 7 is driven by an internal combustion engine 8 and can be separated from the transmission driving shaft 10 on the intake side by use of a clutch 9. The clutch 9 is activated by a control element 12 and a clutch rod assembly 11 that is hinged to the control element 12. Hydraulic actuators or electromechanical actuators are used, for example, as control elements. The control element 12 is connected to the gear control unit 5 and is controlled by the gear control unit. If the clutch 9 is closed and a gear is engaged, the output shaft 3 transfers the combustion engine 8 output via a differential gear 13 to the drive axle 14 and the drive wheels 15 of the indicated motor vehicle.

The gear control unit 5 is furthermore connected to a sensor 16 for sensing the number of revolutions, a speed sensor 17 and a gas-pedal sensor 18. The revolution sensor 16 measures the engine revolutions. The speed sensor 17 measures the motor-vehicle speed, and the gas-pedal sensor 18 detects the gas pedal position and thus the combustion engine load desired by the motor-vehicle driver. The detection of the motor-vehicle speed, the number of engine revolutions and the desired load condition in the gear control unit are used, in a manner known per se, for the automatic selection of the gearbox in the gearshift that is best suited for the load condition of the combustion engine. For this, an extensive selection of control algorithms for the gear control unit is at the disposal of the person skilled in the art.

However, the use of a non-contacting torque sensor 6 in the above-described combination of the already known arrangement for shifting gears in automatic transmissions, is new and inventive. The torque sensor 6 makes it possible to measure the load condition of the transmission drive shaft 2. The torque present at the transmission drive shaft 2 is determined by measuring the magnetic characteristics of a shaft with torque in the drive assembly of the motor vehicle in a compression-stress direction and in a tensile stress direction. For this, the torque sensor 6 comprises an exciter coil and two sensor coils, respectively one sensor coil for the tensile stress direction and one sensor coil for the compression stress direction. The torque sensor 6 is mounted in the drive assembly, very near the shaft surface. To obtain a torque-sensor measuring signal that is mostly independent of the shaft surface quality, the exciter coil of the torque sensor is preferably excited with low frequencies that penetrate deeply into the shaft material. Frequencies in the range of 100 to 1000 Hz are preferably used for exciting the exciter coil. The exciter coil of a less preferred embodiment uses frequencies in the range of 1 kHz to 10 kHz or of 10 kHz to 100 kHz.

In order to determine the suitable shifting moment, it is important to determine the moment at which no torque is present at the gearbox 1. In other words, the moment at which the gearshift is torque-free. It is sufficient to detect the zero passage of the torque present at the gearshift for this. Measuring the amount of torque in standard units is not required and the torque sensor advantageously does not require a calibration. If measuring the amount of torque is desired for another embodiment, then the torque sensor must be calibrated with known torque values.

FIG. 2 shows a suitable and particularly preferred arrangement of the torque sensor 6 on the inside of the transmission case, between the transmission case 19 and the transmission driving shaft 10. The torque sensor signal is transmitted to the gear control unit 5 via signal lines 20, which are guided with a bushing 21 through the wall of the transmission case 19. The torque sensor 6 for the embodiment shown in FIG. 2 is arranged in the drive assembly following the combustion engine 8 and before the clutch 9. However, as shown in FIG. 3, the torque sensor 6 may be located after the engine 8 and the clutch 9. At this location in the drive assembly, between the clutch and the actual transmission, since there is normally sufficient space there for attaching a torque sensor. In addition, it is possible at the latter location of the transmission case 19 to guide through electrical connections for supplying power to the torque sensor and the measuring signal. A transmission that shifts without jolting is thus realized without a considerable increase in costs. The service life of the clutch and the transmission is increased and the operating costs for the motor vehicle are lowered.

FIG. 3 contains two illustrated examples of possible embodiments for a torque sensor 6 for measuring the torque on a shaft. These examples are designed to further explain the measuring principle upon which the invention is based. The output drive shaft 3 is subjected on one end to a torque for driving a load at the other end of the shaft. As a result, torsion is generated in the shaft 3, which forms compression stresses and tensile stresses in the shaft. The compression stresses are shown with a drawn-out line while the tensile stresses are shown with a dash-dot line. Shown are two different torque sensors 6, i.e., a ring sensor 22 and yoke sensor 23, which are both suitable for the arrangement according to the invention. Each of the torque sensors consists of at least one exciter coil 24, 24' and at least two sensor coils 25a, 26b, or $25^1$ or $25^1b$. A magnetic alternating field is respectively generated with the exciter coil 24 on the inside of shaft 3. The magnetic induction of this field (physical formula symbol B) is measured with the sensor coils 25a, 25b. Placing a load with the aid of a torque on the shaft creates anisotropism in the shaft 3, so that the magnetic induction has different field intensities, depending on the direction, as a result of the magneto-elastic effect. For the loaded state of the shaft, the field intensity of the magnetic induction in the compression stress direction will have a different value than in tensile stress direction.

The ring sensor 22 surrounds the shaft 3 over its complete periphery. The exciter coil 24 and the two sensor coils 25a, 25b are mounted on a coil support 26. Sensor coil 25a measures the magnetic inductance in the compression stress direction and the other sensor coil 25b measures the magnetic inductance in tensile stress direction. The ring sensor has the advantage of measuring the field intensities of the magnetic induction over the complete periphery of shaft 3. However, in order to prevent this integral value over the shaft periphery from becoming zero, it is necessary to provide respective flow conducting means or devices on the shaft surface, which preferably carry respectively one directional component of the magnetic field intensity. For the depicted embodiment and the depicted rotational direction, the flow-conducting means 27a conduct the magnetic field lines in the shaft preferably in the compression stress direction, while the flow-conducting means 27b conduct the magnetic field lines preferably in the tensile stress direction. The sensor coil 25a in that case measures the compression stress direction while the sensor coil 25b measures the tensile stress direction. The signals from sensor coils 25a, 25b are preferably connected together in a difference circuit 30, so that the torque sensor 22 supplies a difference signal to the gear control unit 5, as previously described. This difference signal is a measure for the torque-free condition of shaft 3. The flow-conducting means 27a, 27b are preferably formed as web-shaped elevations or elongated furrows in the shaft surface. The flow conducting means can be formed in the shaft body itself or can be fitted as separate ring-shaped component onto the shaft. Important is that the flow-conducting elevations or indentations for the compression stress direction 27a, as well as for the tensile stress direction 27b, form an angle relative to each other that differs from zero. Preferably, they are arranged so as to form a right angle since the compression stress and the tensile stress in the shaft also extend at a right angle to each other.

The yoke sensor 23 is another sensor type that is suitable for the invention. Its magnetic yoke 28 with V-shaped angle carries an exciter coil 24' and two sensor coils 25'a, 25'b. The yoke sensor 23 can measure the two directional components of the magnetic induction field only partially and locally at the shaft surface portion that is located opposite the sensor. However, the yoke sensor 23 does not require additional flow-conducting means on the shaft surface. The yoke 28 itself already functions as a flow-conducting means for the magnetic field lines. The two legs of the V-shaped yoke 28 thus already provide the two preferred directions that are needed. The yoke sensor 23 is preferably aligned on the shaft surface, such that one leg of the V-shaped magnetic yoke 28 is arranged parallel to the compression stress direction of the shaft and one leg is positioned parallel to the tensile stress direction of the shaft. The two legs of the V-shaped yoke 28 preferably are arranged at a right angle to each other. The sensor coil 25'a then measures the magnetic field component in compression stress direction and the sensor coil 25b measures the magnetic field component in the tensile stress direction, respectively for the turning direction of the shaft shown in FIG. 3. If the rotational direction of the shaft changes, then the compression stress direction and the tensile stress direction are also reversed. It is preferable if the signals of the two sensor coils 25'a, 25'b for the yoke sensor 23 are also connected in a difference circuit, so that the zero passage of the difference signal indicates the torque-free condition of the shaft.

The invention now being fully described, it will be apparent to one of ordinary skill in the art that many changes and modifications can be made thereto without departing from the spirit or scope of the invention as set forth herein.

What is claimed is:

1. An arrangement for the torque-free shifting of gears in a drive assembly with a mechanical gearbox, comprising:
    a gearbox having a plurality of gears for changing the transmission ratio for a number of revolutions at an input drive shaft of the gearbox and an output drive shaft of the gearbox;
    a controllable gearshift for actuating the gearbox and engaging the different gears;
    a gear control unit, responsive to variable input control signals, for activating the gearshift; and
    at least one inductive torque sensor installed near a surface of a drive shaft for the drive assembly, and which includes at least one exciter coil for the induction of a magnetic alternating field in the drive shaft of drive assembly, and at least two sensor coils, with one sensor coil being positioned to detect the magnetic field induced in the shaft in a compression stress direction and the other sensor coil being positioned to detect the magnetic field induced in the shaft in a tensile stress direction, with the two sensor coils being connected in a difference circuit that supplies a difference signal as an output measuring signal for the torque sensor, which measuring signal is fed to the gear control unit as an input variable control signal for the gear control unit, which detects a zero passage of the difference signal as a possible moment for a torque-free shifting of gears and wherein several torque sensors are installed near the shaft surface of at least one shaft of the drive assembly.

2. An arrangement according to claim 1, wherein the gear control unit detects a zero passage of the difference signal as a possible moment for a torque-free shifting of gears.

3. An arrangement according to claim 2, wherein the gear control unit triggers the shifting of gears in the gearbox during a zero passage of the difference signal.

4. An arrangement according to claim 2, wherein the input drive shaft of the gearbox is connect by a clutch to the crankshaft of a combustion engine.

5. An arrangement according to claim 4, wherein the output drive shaft of the gearbox is connected to a differential gear for a drive shaft of a motor vehicle.

6. An arrangement according to claim 4, wherein the torque sensor is arranged near the shaft surface of a shaft between the combustion engine and the clutch.

7. An arrangement according to claim 4, wherein the torque sensor is arranged near the shaft surface of a shaft between the clutch and the gearbox.

8. An arrangement according to claim 4, wherein the gear control unit detects a malfunction if the torque sensor does not indicate a zero passage despite an activated clutch.

9. An arrangement according to claim 1, wherein the torque sensor is arranged near the shaft surface of the input drive shaft of the gearbox.

10. An arrangement according to claim 1, wherein the torque sensor is arranged near the shaft surface of the output drive shaft of the gearbox.

11. An arrangement for the torque-free shifting of gears in a drive assembly with a mechanical gearbox, comprising:

- a gearbox having a plurality of gears for changing the transmission ratio for a number of revolutions at an input drive shaft of the gearbox and an output drive shaft of the gearbox;
- a controllable gearshift for actuating the gearbox and engaging the different gears;
- a gear control unit, responsive to variable input control signals, for activating the gearshift; and
- at least one inductive torque sensor installed near a surface of a drive shaft for the drive assembly, and which includes of at least one exciter coil for the induction of a magnetic alternating field in the drive shaft of the drive assembly, and at least two sensor coils, with one sensor coil being positioned to detect the magnetic field induced in the shaft in a compression stress direction and the other sensor coil being positioned to detect the magnetic field induced in the shaft in a tensile stress direction, with the two sensor coils being connected in a difference circuit that supplies a difference signal, as an output measuring signal for the torque sensor, which measuring signal is fed to the gear control unit as an input variable control signal for the gear control unit that detects a zero passage of the difference signal as a possible moment for a torque-free shifting of gears; and, wherein the input drive shaft of the gearbox is connect by a clutch to the crankshaft of a combustion engine, and the gear control unit furthermore is connected to a plurality of further sensors, including an engine revolution sensor, a speed sensor, a gas-pedal sensor and a controllable actuator for activating the clutch; and the gear control unit triggers a shifting of the gears in the gearbox in dependence on the variable input control signals from the plurality of connected sensors.

12. An arrangement according to claim 11, wherein the gear control unit detects a malfunction if the torque sensor does not indicate a zero passage despite an activated clutch.

13. An arrangement according to claim 11, wherein the output drive shaft of the gearbox is connected to a differential gear for a drive shaft of a motor vehicle.

14. An arrangement according to claim 11, wherein the torque sensor is arranged near the shaft surface of the input drive shaft of the gearbox.

15. An arrangement according to claim 11, wherein the torque sensor is arranged near the shaft surface of the output drive shaft of the gearbox.

16. An arrangement according to claim 11, wherein the torque sensor is arranged near the shaft surface of a shaft between the combustion engine and the clutch.

17. An arrangement according to claim 11, wherein the torque sensor is arranged near the shaft surface of a shaft between the clutch and gearbox.

* * * * *